L. B. WOOLEVER.

Staff-Gages for Dressing Millstone.

No. 135,956.    Patented Feb. 18, 1873.

Witnesses:
A. F. Cornell.
L. S. Critchley.

Inventor:
Lester B. Woolever.
Per. Burridge & Co.
Attys.

UNITED STATES PATENT OFFICE.

LESTER B. WOOLEVER, OF MECHANICSVILLE, OHIO.

IMPROVEMENT IN STAFF-GAGES FOR DRESSING MILLSTONES.

Specification forming part of Letters Patent No. 135,956, dated February 18, 1873.

*To all whom it may concern:*

Be it known that I, LESTER B. WOOLEVER, of Mechanicsville, in the county of Ashtabula and State of Ohio, have invented a certain new and Improved Staff-Gage for Dressing Millstones; and I do hereby declare that the following is a full, clear, and complete description thereof, reference being had to the accompanying drawing making part of the same.

Figure 1:
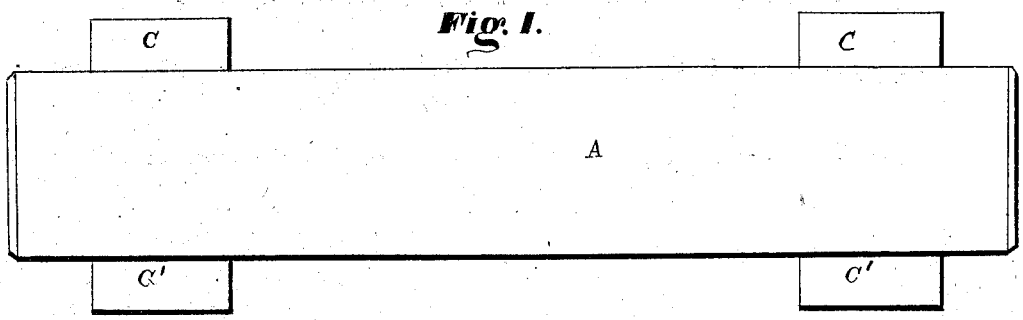
Figure 2:
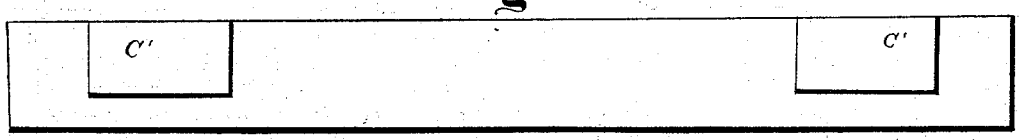
Figure 3:
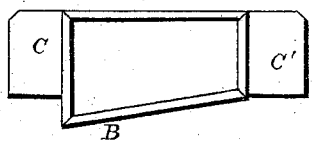

Figure 1 is a view of the upper side of the staff. Fig. 2 is an edge view. Fig. 3 is an end view.

Like letters of reference refer to like parts in the several views.

The nature of this invention relates to a staff for dressing the face of millstones; and the special object thereof is to gage the depth of the channels or grooves therein, so that they shall be of a uniform depth and evenness.

The grooves or channels in the face of millstones are usually cut therein at a venture as to their depth and evenness of surface. The consequence of such guess-work is, that the channels are of unequal depth, and the depth of each channel variable, and the bottom uneven. This has been unavoidable, as no gage or straight-edge has been used in perfecting this part of the dressing of millstones. This want of uniformity in the depth of the channels and the unevenness of their bottom results in the loss of flour and imperfect manufacture of the same.

In order to avoid the irregularity of the depth of the channels and the unevenness of the bottom thereof I use the staff-gage hereinafter described, which consists of a stick of wood, A, about the width of a channel or groove. The under side of said stick is slanting from one edge thereof to the other, as shown at B, Fig. 3. In consequence of the slant given to the under side of the staff, one edge thereof is thicker than the other, said difference being equal to the depth of the grooves or channels in the face of the stone. From each edge of the staff projects a pair of ears, C C'. The ears C' are equal in thickness to the edge to which they are attached, whereas the ears C are not so thick as the edge from which they project by so much as the difference in the thickness of the two edges, as shown in the end view, Fig. 3, which difference is the depth that one side of the groove is cut, running upward therefrom to the surface, forming an inclined plane of the bottom. To the groove thus formed the under side of the gage corresponds when laid therein, which is done from time to time while cutting the channel to see that the bottom thereof is level and smooth and of the required depth. For this purpose the under side of the gage is chalked.

While using the gage the ears C' rest upon the face of the stone, and from which side the groove commences to grade downward until the ears C also come to the face of the stone, which will give the necessary depth for the groove or channel. By this means each groove will be cut to the depth of the gage, thereby producing a uniformity in the depth of all the channels.

Claim.

What I claim as my invention, and desire to secure by Letters Patent, is—

The herein-described staff-gage for dressing millstones, consisting of the staff A, having one side thereof slanting from one edge to the other, thereby making one edge thicker than the other, as described, and ears C C', arranged in relation to the staff A substantially as set forth, and for the purpose specified.

LESTER B. WOOLEVER.

Witnesses:
W. H. BURRIDGE,
A. F. CORNELL.